July 4, 1939. A. H. SCHMAL 2,165,155
AUTOMOTIVE PROPELLER SHAFT SUPPORT BEARING UNIT
Filed Jan. 30, 1937
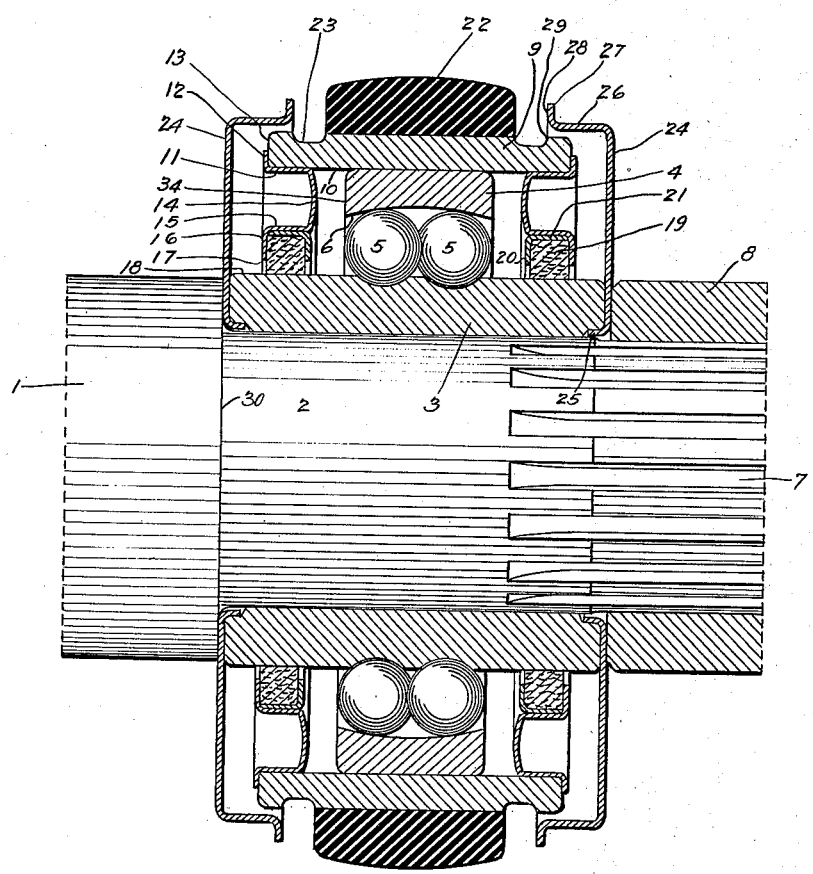
INVENTOR.
Alois H. Schmal
BY *Chas. Lynn Russell*
*his* ATTORNEY.

Patented July 4, 1939

2,165,155

UNITED STATES PATENT OFFICE 2,165,155

AUTOMOTIVE PROPELLER SHAFT SUPPORT BEARING UNIT

Alois H. Schmal, Philadelphia, Pa., assignor to S K F Industries, Inc., Philadelphia, Pa., a corporation of Delaware Application January 30, 1937, Serial No. 123,087

2 Claims. (Cl. 308—184)

This invention relates to bearing boxes, more especially to shaft support bearing units and is particularly adapted for use as an automotive propeller shaft supporting bearing unit. What I now regard as a preferred embodiment of my invention has been utilized in the form of a rubber encased automotive propeller shaft bearing box.

One of the objects of my invention is to provide a self-contained, initially lubricated, rubber insulated unit employing a self-aligning bearing.

Another object of the invention is to provide a unit of this character which is easily assembled to the shaft and to the mounting bracket.

Another object of the invention is to provide a bearing unit where the supporting cartridge, enclosure seals, flingers and bearing are embraced around the bearing inner race member which is preferably extended on both sides.

Another object of the invention is to provide a bearing box unit wherein a self-aligning bearing is employed to compensate for varying shaft misalignment, which in the case of an automotive propeller shaft is produced by the chassis frame weave and is caused by the irregular road surfaces over which the chassis travels.

Another object of the invention is to provide a shaft supporting bearing unit wherein a tubular sleeve, in which the bearing may slide axially, is supported in rubber to prevent sound transmission from the shaft and bearing to the supporting bracket.

Another object of the invention is to provide a supporting unit wherein a rubber insulating ring vulcanized to a bearing cartridge restrains the cartridge axially.

Another object of the invention is to provide a bearing box unit wherein a rubber support ring is spherically surfaced to permit initial alignment to compensate for mounting inaccuracies in assembling to a mounting bracket.

Another object of the invention is to provide a bearing box unit wherein sealing elements forming an enclosure to retain lubricant and restrain entrance of foreign matter into the bearing may be mounted.

Another object of this invention is to provide a bearing supporting unit which is adaptable to a variety of mounting brackets whether to support it radially or axially to a frame, upright or cross member.

In the drawing accompanying this specification one practicable embodiment of my invention is illustrated in central section and mounted upon a portion of a shaft which is shown in elevation.

The shaft 1 is assumed to be a portion of the propeller shaft of some automotive device and has a reduced portion 2 upon which is mounted the inner race ring 3 of a ball bearing. As this ring extends beyond the respective sides of the outer bearing race ring 4, the bearing is what is termed an extended inner race ring bearing. Two rows or sets of balls 5—5 are illustrated as running in grooves formed in the median portion of the inner ring 3. The race way member 4 is shown provided on its interior with a spherical surface 6 upon which the balls 5 roll and upon which they may align. The bearing may, therefore, be representative of a self-aligning anti-friction bearing, the rolling elements of which are balls.

The right hand end of the reduced portion 2 of the shaft is shown as splined in a well known manner at 7, upon which end there is mounted a sleeve, the inner end 8 only of which is illustrated.

A cylindrical surface is preferably formed on the outer side of the outer bearing race member 4. This race member is shown mounted in the bore of a cartridge in the form of cylindrical sleeve 9. The wall 10 of the bore of this sleeve is assumed to be cylindrical to accommodate the cylindrical outer surface of the bearing outer member 4. This permits the bearing member 4 to slide axially within the cartridge 9.

The bearing is preferably sealed on each side by a closure member, which in the illustration comprises a plate having a cylindrical portion 11, which is pressed into the bore 10 of the cartridge 9. There is a flange 12 extending outwardly from this portion 11 for engaging the outer wall face 13 of the cartridge 9. The closure plate has a portion bent substantially at right angles to the cylindrical portion 11, which is indicated by the reference character 14. This part may with advantage be bowed inwardly to add rigidity to the structure. It is then bent outwardly forming a cylindrical portion 15, about equal in extent to the portion 11. It, then, has a flat portion lying substantially in the plane of the flat flange 12. The inner edge 17 of this portion 16 is shown as having ample clearance with the outer cylindrical surface 18 of the inner bearing member 3 to permit alignment of the cartridge 9 in relation to the inner bearing member 3. An oil sealing device 19 is shown held against the shaft and the inner side face of the portion 16 by means of a ring 20 having a flange portion 21, which fits snugly inside of the cylindrical portion 15.

The flanges 12 locate the closure devices at a predetermined distance inwardly of the ends of the cartridge 9. The inward bow at 14 at each side is in position to engage the side 34 of the race member 4, should this slide far in either direction, and hold the other portions of the closure out of the path of movement of the balls on that side.

These closure plates which are carried by the respective ends of the cartridge 9 are securely held in position by frictional engagement with the bore of the cartridge 9. In many applications of bearings embodying my invention, the bearing will be sealed for life. However, when it does become necessary to obtain access to the bearing itself, it is a simple matter to pry off one or both of the closures, and as they are very inexpensive, if injured they can be replaced by new ones.

The tubular sleeve or cartridge 9 is shown furnished with a rubber ring 22, which is preferably vulcanized in position on the cartridge, and is to be engaged by the support for the device for yieldingly restraining it axially. The outer surface of this rubber ring is given a spherical formation to permit initial alignment to compensate for mounting inaccuracies in assembling to a mounting bracket. One of the purposes of the rubber is to support the unit so as to prevent sound transmission from the shaft and bearing to the supporting bracket.

The width of the rubber ring 22 is shown as greater than the width of the outer bearing race ring 4, but shorter than the width of the tubular sleeve or cartridge 9 to which it is vulcanized. Adjacent to each end of the rubber ring 22 a circumferential groove or channel is shown in the outer surface of the cartridge 9 for the purpose of draining off foreign matter which may be stopped by the channel from entering within the bore of the cartridge. These channels are indicated by the reference character 23.

Each end of the unit is shown protected by an enclosure plate 24, which is substantially flat. It has on its inner portion near the opening which surrounds the shaft 2 an inwardly turned flange 25, which is seated in an enlarged portion in the bore of the inner race ring member 3. The outer portion of the plate 24 is shown as being bent, at approximately right angles, inwardly into a substantially cylindrical portion 26 which ends in an outwardly turned flange portion 27. The inner face 28 of which latter portion is substantially in line with the outer edge 29 of the groove 23 to assist in flinging off water, oil and other matter which finds lodgement in such groove 23.

In mounting a device on a shaft, similar to that shown in the drawing: the plate 24 at the left hand end is first threaded over the reduced portion 2 of the shaft until it comes against the shoulder 30; the assembled and prelubricated portions comprising the antifriction bearing, the cartridge 9 with its resilient ring 22, is threaded on the shaft; the closure plate 24 for the other end of the cartridge is next slid on to the reduced end of the shaft; and then the sleeve 8 is mounted on the end of the shaft and secured in some suitable manner not shown.

It is to be understood that the device in the form shown and described is illustrative only of the invention and that changes may be made within the scope of claims without departing from the spirit of my invention.

Having thus described my invention, I claim and desire to secure by Letters Patent:

1. In a bearing box, the combination with a self-aligning bearing, of a cartridge within which the bearing is mounted, and a rubber insulating ring vulcanized to the outer side of the cartridge the outer surface of the rubber ring being spherical.

2. In a bearing box, the combination with a self-aligning anti-friction bearing, of a cartridge within which the bearing is mounted, and a rubber insulating ring vulcanized to the outer side of the cartridge, the outer surface of the rubber ring being spherical.

ALOIS H. SCHMAL.